United States Patent [19]

Parker et al.

[11] Patent Number: 4,796,655

[45] Date of Patent: Jan. 10, 1989

[54] FLUID CONTROL DEVICES

[75] Inventors: Dennis W. Parker, Cheltenham; David F. Lakin, Churchdown, both of England

[73] Assignee: Dowty Hydraulic Units Limited, Cheltenham, England

[21] Appl. No.: 92,581

[22] Filed: Sep. 3, 1987

[30] Foreign Application Priority Data

Jun. 9, 1987 [GB] United Kingdom ................. 8721532

[51] Int. Cl.[4] ................................ G05D 16/00

[52] U.S. Cl. ................................ 137/83; 91/3; 137/625.64

[58] Field of Search ...................... 137/83, 82, 625.64; 91/3

[56] References Cited

U.S. PATENT DOCUMENTS 2,904,057 9/1959 Callender ............................ 137/83

3,774,644 11/1973 Leutner ............................ 137/83 X

*Primary Examiner*—Alan Cohan

*Attorney, Agent, or Firm*—Young & Thompson

[57] ABSTRACT

A fluid control device comprising a pivotable member which has a planar major face and is mounted so as to enable pivotal motion about an axis parallel to the major face. The pivotable member including a fluid jet channel which directs a fluid jet towards a fluid receiving channel defined in a receiving member. The pivotable member is pivotally rotated about the axis by a device operable to pivot the pivotable member. This device may be an electromagnet disposed with its poles adjacent and parallel to the major face of the pivotable member. The motion of the pivotable member alters the relative positions of the fluid jet channel/channels and the fluid receiving channel/channels and thereby the quantity of fluid received by the fluid receiving channel/channels.

11 Claims, 5 Drawing Sheets

FLUID CONTROL DEVICES

This invention relates to fluid control devices and in particular, fluid control devices which utilise the fluid jet principle.

It is known to use a fluid control device to control a two-stage electro-hydraulic servo valve. In such a valve an input signal supplied, for example, to an electromagnet causes movement of a jet of fluid in the control device which results in a difference of pressure between two ducts. This difference of pressure in turn may be used to control the position of a spool valve element which forms the second stage of the valve.

The present invention is concerned with providing a fluid control device which is compact in construction and which can be manufactured in a relatively straightforward and simple manner.

According to the present invention there is provided a fluid control device comprising a pivotable member having a planar major face and mounted so as to be pivotable about an axis parallel to the major face, the pivotable member including a fluid jet channel which directs a fluid jet parallel to the major face and transverse to the pivot axis at a position remote from the pivot axis, a receiving member defining a fluid receiving channel which is positioned so as to receive the fluid jet, and means operable to pivot the pivotable member about the pivot axis so as to alter the position of the fluid jet channel relative to the fluid receiving channel and thereby vary the quantity of fluid received by the fluid receiving channel.

Further, in accordance with the invention a fluid control device comprising a pivotable member having a planar major face and mounted so as to be pivotable about an axis parallel to the major face, the pivotable member including a fluid jet channel which directs a fluid jet parallel to the major face and transverse to the pivot axis at a position remote from the pivot axis, a receiving member defining a fluid receiving channel which is positioned so as to receive the fluid jet, and electromagnet means disposed with poles adjacent and parallel to the major face of the pivotable member and operable to pivot the pivotable member about the pivot axis so as to alter the position of the fluid jet channel relative to the fluid receiving channel and thereby vary the quantity of fluid received by the fluid receiving channel.

Preferably, the fluid jet channel comprises a nozzle which is incorporated in the pivotable member.

Alternatively, the fluid jet channel is a deflector means, which redirects a fluid jet towards the fluid receiving channel. In this alternative arrangement the fluid control device may include two or more nozzles mounted in the device so as to direct a fluid jet towards the fluid jet channel. The fluid jet channels will then act so as to redirect the fluid jets towards the fluid receiving channels.

In a first preferred embodiment the pivotable member incorporates two fluid jet nozzles, at positions remote from the pivot axis, and on opposite sides of the pivot axis, which nozzles direct two fluid jets parallel to the major face and transverse to the pivot axis in opposite directions and the receiving member defines two fluid receiving channels, each of which is opposite a fluid jet nozzle to receive fluid therefrom.

Conveniently the pivotable member incorporates a fluid supply passage comprising a first duct extending along the pivot axis and a further duct extending from the first duct to the or each fluid jet nozzle. Provided that the material of the pivotable member is sufficiently resilient the first duct may extend directly into the member on which the pivotable member is mounted without the necessity for a special connection.

In a second preferred embodiment the pivotable member includes two fluid jet deflector channels, each of which is at a position remote from the pivot axis but on opposite sides of the pivot axis, and which direct a fluid jet parallel to the major face and transverse to the pivot axis, and, the receiving member defines two fluid receiving channels, each of which is opposite a fluid jet channel to receive fluid therefrom.

In the arrangement of the second preferred embodiment, the fluid jet channels and fluid receiving channels are U-shaped in cross-section. The actual shape of the U is a manufacturing/performance related criteria. Preferably, the U-shaped cross-section are in opposition to one another.

The two fluid jet channels are preferably positioned equidistant from the pivot axis along a common line perpendicular to the pivot axis. However, other arrangements are also possible in which there are more than two fluid jet channels and more than two fluid receiving channels, and, if required, there may be a greater number of receiving channels than fluid jet channels.

The pivotable member may comprise a first laminar portion parallel to the major face and made of substantially non-magnetizable material incorporating the or each fluid jet channel, and a second laminar portion made of magnetizable material overlying the first laminar portion and defining the major face.

The receiving member may surround the pivotable member and serve to pivotally support the pivotable member.

Preferably the receiving member and the pivotable member are integrally formed from a single sheetlike element which is sufficiently flexible to allow pivoting of the pivotable member relative to the receiving member. Advantageously the material of the pivotable member is chosen so that it has a torsional resistance such that it will allow tortional displacements.

The invention also provides a fluid control device comprising a sheet-like element incorporating cut outs so as to form a receiving member surrounding an integral pivotable member which is so connected to the receiving member as to be pivotable relative to the receiving member about an axis parallel to the major faces of the element, the pivotable member incorporating a fluid jet channel for producing a fluid jet parallel to the major faces and transverse to the pivot axis at a position remote from the pivot axis, the receiving member incorporating a fluid receiving channel which opens opposite the fluid jet channel to receive fluid therefrom, and actuating means operable to pivot the pivotable member about the pivot axis to change the position of the fluid jet channel receive to the fluid receiving channel and to thereby vary the quantity of fluid received by the fluid receiving channel.

The invention will now be described, by way of example, with reference to the accompanying drawings, in which.

Figure 2:
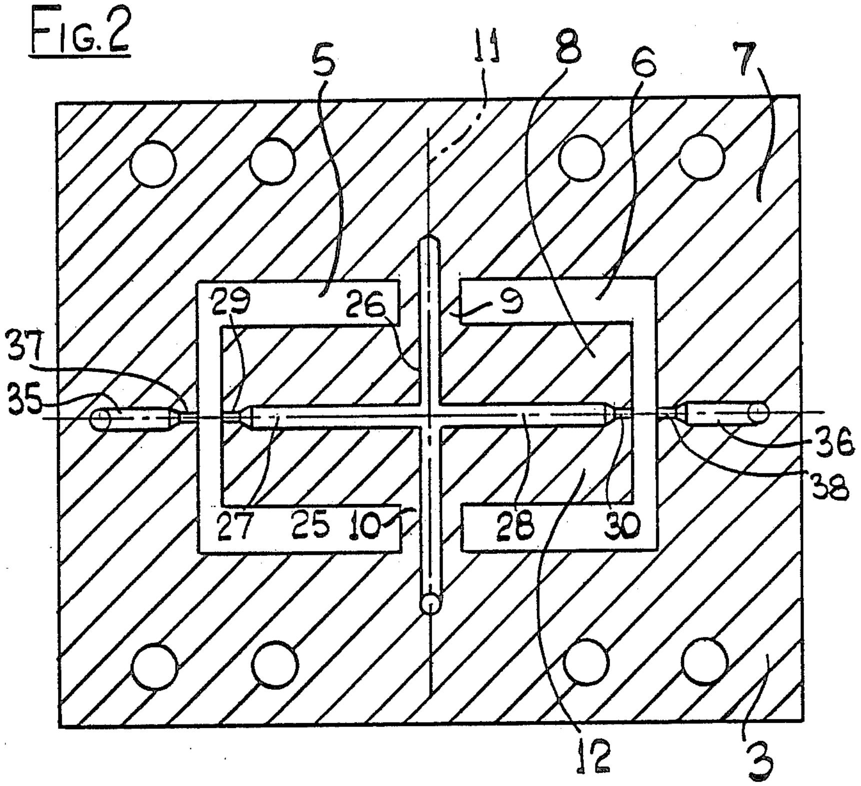
FIG. 2 is a section along the line II—II of FIG. 1.
Figure 3:
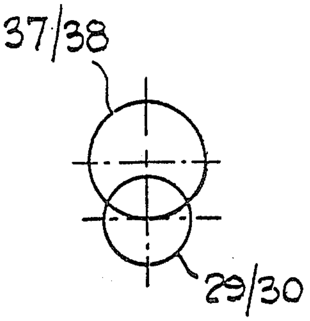
Figure 4:
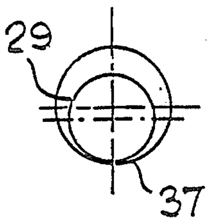
Figure 5:
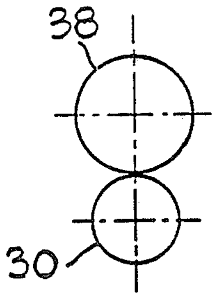
Figure 6:
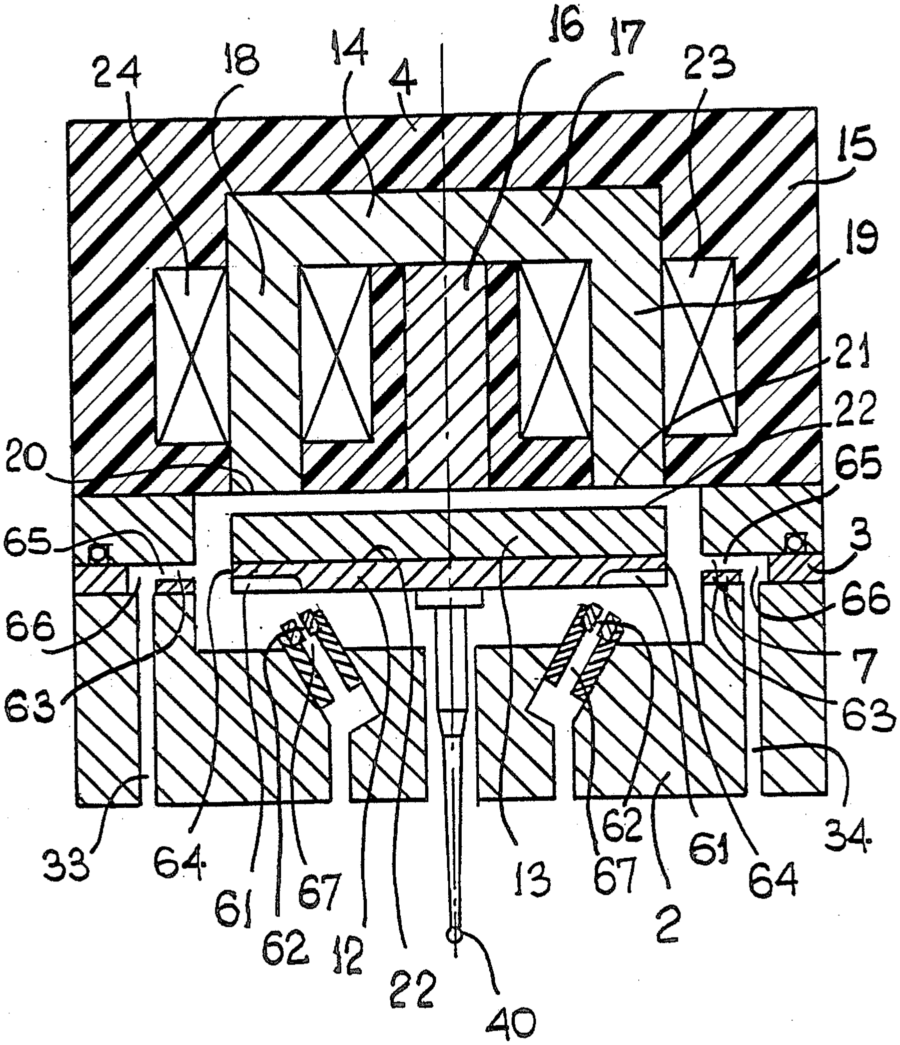
Figure 7:
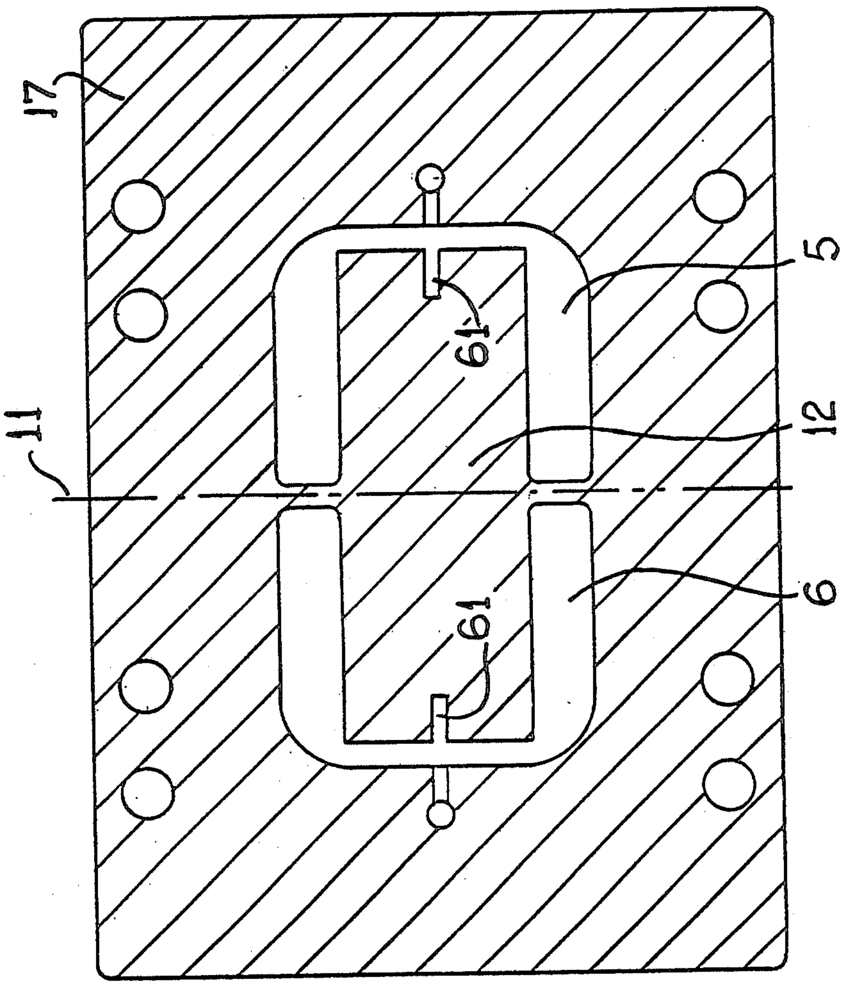
Figure 8:
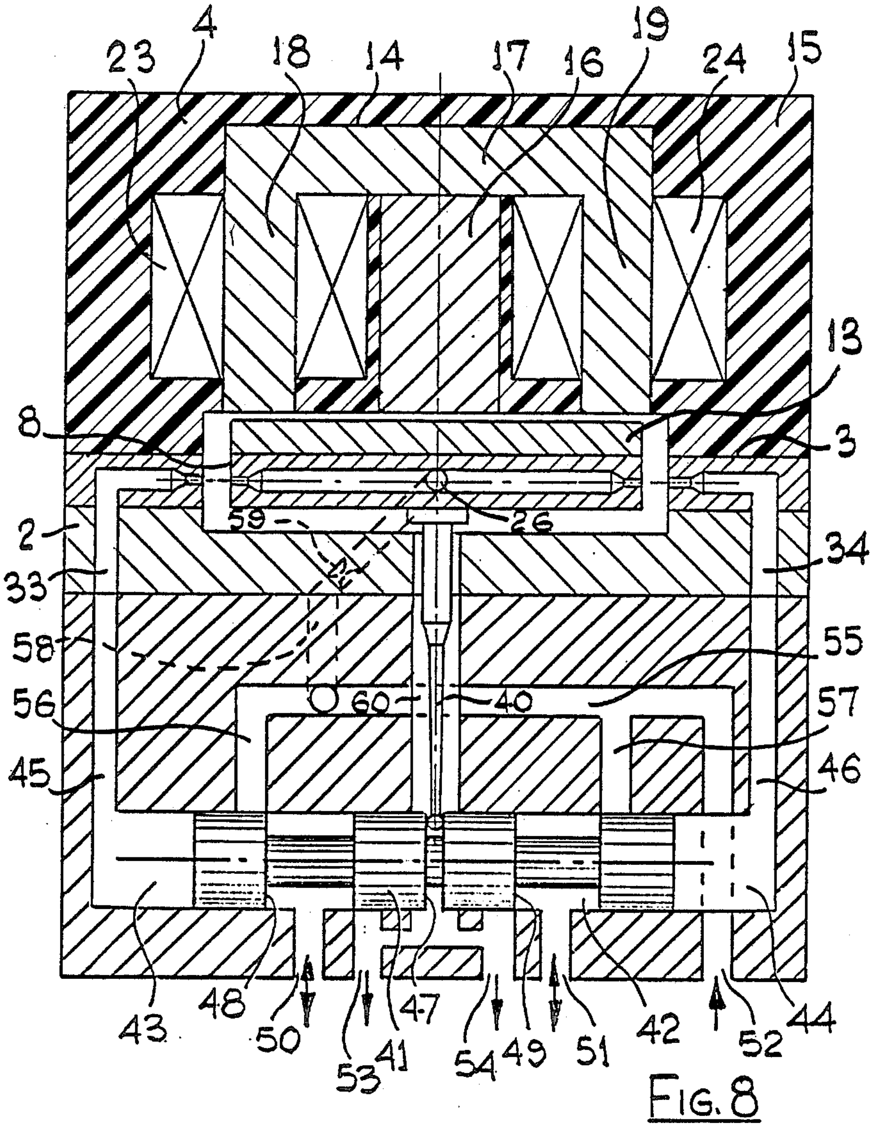

FIGS. 3, 4, & 5 are schematic representations of the relative positions of the fluid jet nozzles and receiving channels of the first device in accordance with the invention;

FIG. 6 is a vertical section through a second fluid control device in accordance with the invention;

FIG. 7 is a similar section to FIG. 2 of the second fluid control device as shown in FIG. 6; and FIG. 8 is a vertical section of a servo valve incorporating a first fluid control device in accordance with the invention.

Figure 1:
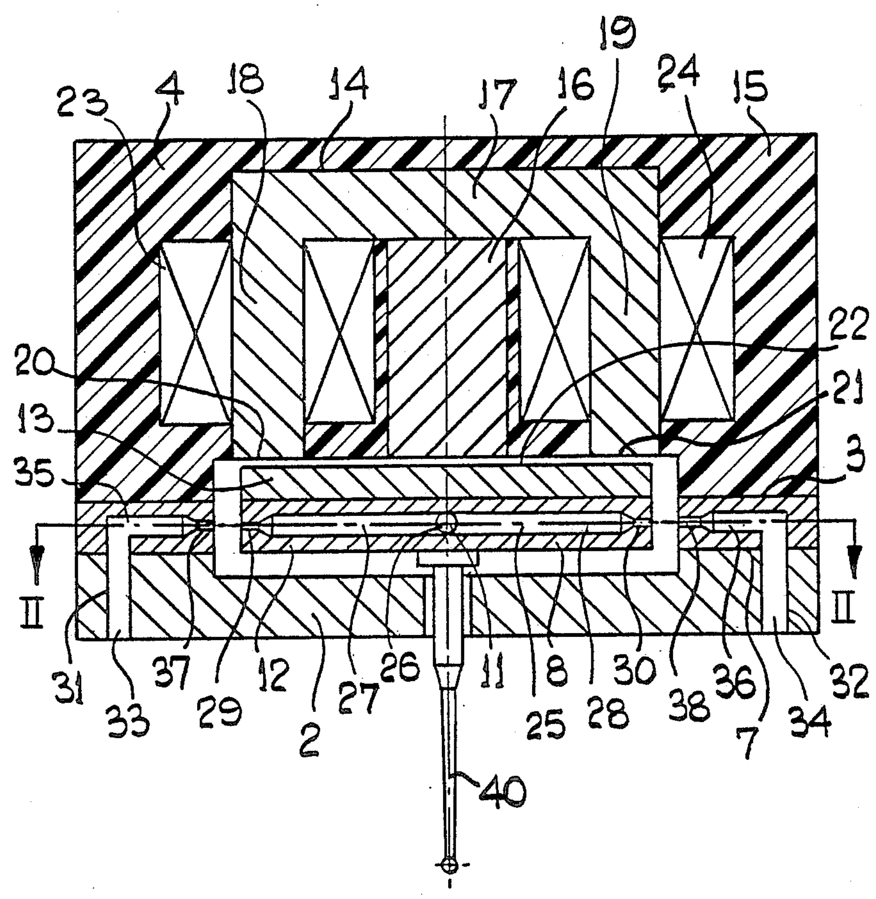
FIG. 1 is a vertical section through a first fluid control device in accordance with the invention.

Referring to FIGS. 1 and 2, a fluid control device comprises a base plate 2, a sheet-like element 3 and an upper element 4. The sheet-like element 3 incorporates cut outs 5 and 6 forming a receiving member 7 surrounding an integral pivotable member 8 connected to the receiving member 7 by connecting portions 9 and 10 of sufficient flexibility to enable the pivotable member 8 to be pivoted through a limited angle about a pivot axis 11 with respect to the receiving member 7 whilst at the same time providing a certain torsional resistance to such pivotal movement.

The pivotable member 8 comprises not only a laminar portion 12 integrally formed with the receiving member 7 and made of substantially nonmagnetizable material, but also a second laminar portion 13 made of magnetizable material which overlies the first laminar portion 12 and is secured thereto mechanically or by adhesive. This second laminar portion 13 constitutes an armature. In addition the upper element 4 incorporates an electromagnet 14 surrounded by suitable encapsulating material 15. The electromagnet 14 incorporates a central permanent magnet 16 and an inverted U-shaped soft iron core 17 having limbs 18 and 19 defining respective opposite poles 20 and 21 disposed adjacent and parallel to a major face 22 of the pivotable member 8 on opposite sides of the pivot axis 11. Each of the limbs 18 and 19 is surrounded by a respective actuating coil 23 or 24.

When the actuating coils 23 and 24 are suitably electrically energised, a variable magnetic field is superimposed upon the magnetic field associated with the permanent magnet 16 and magnetic interaction takes place between the poles 20 and 21 and the magnetizable material of the armature 13 so as to cause the pivotable member 8 to pivot about the pivot axis 11.

The portion 12 of the pivotable member 8 has a fluid supply passageway 25 extending therethrough parallel to the major face 22. The passageway 25 comprises first duct 26 extending along the pivot axis 11 and through the connecting portions 9 and 10, and respective further ducts 27 and 28 extending perpendicularly of the first duct 26 in opposite directions and forming fluid jet nozzles 29 and 30 where they open outwardly at opposite ends of the pivotable member 8. In addition passageways 31 and 32 comprising ducts 33 and 34 extending through the base plate 2 and ducts 35 and 36 in the receiving member 7 open opposite the fluid jet nozzles 29 and 30 and provide fluid receiving orifices 37 and 38 for receiving fluid from the nozzles 29 and 30.

When no input signal is supplied to the actuating coils 23 and 24 of the electromagnet 14, the pivotable member 8 will be in its null position, as shown in FIG. 1, and the alignment of each of the fluid jet nozzles 29 and 30 with respect to the fluid receiving orifices 37 and 38 will be as shown diagrammatically in FIG. 3, so that substantially equal quantities of fluid will be received by each fluid receiving orifice 37 or 38. On the other hand, when a 100% signal in a first sense is supplied to the coils 23 and 24 the pivotable member 8 will be caused to pivot to its fullest extent in a clockwise sense in FIG. 1 so that the position of the nozzle 29 with respect to the orifice 37 will then be as shown diagrammatically in FIG. 4 and the position of the opposite nozzle 30 with respect to the orifice 38 will be as shown diagrammatically in FIG. 5. In this case it will be appreciated that the quantity of fluid received by the orifice 37 will be substantially greater than that received by the orifice 38. In fact substantially all the fluid from the nozzle 29 will be received by the orifice 37, and little or none of the fluid from the nozzle 30 will be received by the orifice 38. If a 100% signal is applied to the coils 23 and 24 in the opposite sense the pivotable member 8 will be caused to pivot in the anti-clockwise direction in FIG. 1, and this will then result in the relative positions of the nozzle 30 and the orifice 38 being as shown for the nozzle 29 and the orifice 37 in FIG. 4 and the relative positions of the nozzle 29 and orifice 37 as shown for the nozzle 30 and orifice 38 in FIG. 5, so that the opposite condition will then apply. It will be appreciated that signals of less than 100% supplied in either sense to the coils 23 and 24 will give rise to intermediate relative positions of the nozzles 29 and 30 and the orifices 37 and 38.

Now referred to FIGS. 6 and 7 of the drawings, a second form of fluid control device is shown.

The device is similar to that described with reference to FIGS. 1 to 5 of the drawings, therefore like numerals have been used to indicate like parts and the description thereof is include by way of reference.

In the second form of the device the laminar portion 12 is formed with two U-shaped fluid jet channels 61 which act to direct fluid jets from nozzles 62 towards respective U-shaped fluid receiving channels 63. The relationship of the fluid jet channels 61 to the fluid receiving channels 63 is such that they are inverted with respect to each other.

The nozzles 62 are mounted in the baseplate 2 of the fluid control device, so that the fluid jets therefrom impinge the fluid jet channel 61 in such a way that they are re-directed (deflected) in a direction parallel to the major face 22 towards the nearest respective secondary major face 64, and the respective fluid receiving channel 63.

That is, the fluid jet impinges the fluid jet channel, with respect to the direction of flow of the jet, at an acute angle, so that deflection of the jet occurs. It is envisaged that in certain fluid control devices the fluid jet may be deflected through any angle.

The nozzles 62 are supplied with fluid via the fluid passages 67 in the base plate 2.

The fluid entering the fluid receiving channel 63 passes along a passage 65 to a chamber 66 and from there onto a respective duct 33, 34.

The relationship of the fluid jet channel 61 and the fluid receiving channel 63 with respect to each other is such that the principle and effect discussed in relation to FIGS. 3 to 5 for nozzles is also utilised in the present case. In view of the earlier discussion with regard to nozzles a detailed discussion of this relationship is not included here, but the principle detail is included by way of reference.

Either of the above described forms of fluid control device may be used to form the first stage of a two stage electro-hydraulic servo valve.

Now referring to FIG. 8 a two stage electrohydraulic servo valve is illustrated in which the first stage comprises the fluid control device described with reference to FIGS. 1 to 5 of the drawings. It should however be stressed that the fluid control device described with reference to FIGS. 6 and 7 could easily perform the same function.

In the servo-valve illustrated in FIG. 8, the second stage comprises a spool valve element 41 located in an elongate chamber 42 having a respective end 43 or 44 in communication with each of the ducts 33 and 34 by way of ducts 45 and 46, so that the position of the spool valve element within the chamber is controlled by the relative fluid pressures within the ducts 33 and 34. A feedback wire 40 is secured to the underside of the pivotable member 8 and engages within an annular recess 47 in the spool valve element 41.

In addition the spool valve element 41 incorporates two annular recesses 48 and 49 in communication with two service ports 50 and 51 for connection, for example, to opposite sides of a hydraulically actuated piston (not shown). An inlet port 52 is provided for connection to a source (not shown) of hydraulic fluid under pressure, and two return ports 53 and 54 are provided for connection to a reservoir (not shown). Hydraulic fluid supplied to the inlet port 52 passes into a duct 55 having branches 56 and 57 connectable to the recesses 48 and 49 in the spool valve element 41. Furthermore a small proportion of the hydraulic fluid supplied passes by way of a duct 58 incorporating a restriction 59 to the duct 26 extending along the pivot axis of the pivotable member 8.

In the null position of the spool valve element 41 shown in FIG. 8 the service ports 50 and 51 are not in fluid communication with the inlet port 52 or with the return ports 53 and 54 so that the two sides of the hydraulically operated piston will be maintained in equilibrium. On the other hand, application of a signal to the coils 23 and 24 in such a sense as to pivot the pivotable member 8 clockwise as seen in FIG. 8 will cause an increase in pressure in the chamber end 43 and a decrease in pressure in the chamber end 44 to the right to a position in which the service port 50 is placed in fluid communication with the return port 53 by way of the recess 48 and the service port 51 is placed in fluid communication with the inlet portion 52 by way of the duct 55, the branch 57 and the recess 49. This causes the hydraulically operated piston to be operated in one direction.

Conversely application of a signal to the coils 23 and 24 in such a sense as to pivot the pivotable member 8 anti-clockwise as seen in FIG. 8 will cause a decrease in pressure in the chamber end 43 and an increase in pressure in the chamber end 44, resulting in displacement of the spool valve element 41 to the left to a position in which the service port 50 is placed in fluid communication with the inlet port 52 by way of the duct 55, the branch 56 and the recess 48 and the service port 51 is placed in fluid communication with the return port 54 by way of the recess 49. This causes the hydraulically operated piston to be operated in the opposite direction.

In this manner the spool valve element 41 may be actuated by an electrical control signal with a particularly rapid response time. Also the gaps between the fluid jet nozzles 29 and 30 in the pivotable member 8 and the fluid receiving orifice 37 and 38 in this construction are substantial by comparison with the diameter of the nozzles 29 and 30. The chamber surrounding the pivotable member 8 is maintained at a low pressure relative to the pressure of the jets by virtue of the fact that the chamber is in fluid communication with the return ports 53 and 54 by way of a duct 60 accommodating the feedback wire 40.

In an alternative arrangement the feedback wire is replaced by two springs provided at opposite ends of the spool valve element and acting to centre the spool valve element.

Although in the illustrated device the pivot axis is disposed equidistant from the two ends of the pivotable member, it should be appreciated that the pivot axis may in other embodiments be provided at different points along the pivotable member.

Furthermore the device may include only a single fluid jet nozzle, and the pivot axis may be provided at one end of the pivotable member which will in that case be of cantilever type.

One or more receiving orifices may be provided in this single fluid jet nozzle arrangement. Multiple fluid jet nozzle arrangements are also feasible.

The arrangements of nozzles and orifice may be such that a shaped relationship between current input to the device to flow output can be generated.

In further variants of the illustrated device, the fluid jet nozzles may be formed by nozzle insets introduced into the ends of the ducts in the pivotable member. The receiving orifices may be similarly formed by insets introduced into the ends of the ducts in the receiving member.

Furthermore, instead of the ducts in the pivotable member being formed in the portion made of substantially non-magnetizable material, they may be formed in the portion made of magnetizable material or may even be formed by separate pipes attached to the lower surface of the pivotable member. Conveniently the ducts may be formed by a laminated construction, for example, by an upper laminate having suitable grooves in its lower surface and a lower laminate having a flat upper surface which is bonded to the lower surface of the upper laminate, or by a three-layer arrangement having an upper laminate with a flat lower surface, a lower laminate with a flat upper surface and an intermediate laminated formed by profiled segments defining the ducts therebetween. In addition the pivotable member may be a separate part from the surrounding receiving member.

We claim:

1. A fluid control device comprising a pivotable member having a planar major face and mounted so as to be pivotable about an axis parallel to the major face, the pivotable member including a first layer of non-magnetizable material having a fluid jet channel which directs a fluid jet parallel to the major face and transverse to the pivot axis at a position remote from the pivot axis and a second layer of magnetizable material, a receiving member defining a fluid receiving channel which is positioned so as to receive the fluid jet, and electromagnetic means selectively operable on said magnetizable material to pivot the pivotable member about the pivot axis so as to alter the position of the fluid jet channel relative to the fluid receiving channel and thereby vary the quantity of fluid received by the fluid receiving channel.

2. A fluid control device comprising a pivotable member having a planar major face and mounted so as to be pivotable about an axis parallel to the major face, the pivotable member including a first layer of non-magnetizable material having a fluid jet channel which directs a fluid jet parallel to the major face and transverse to the pivot axis at a position remote from the pivot axis and a second layer of magnetizable material, a receiving member defining a fluid receiving channel which is positioned so as to receive the fluid jet, and electromagnet means disposed with poles adjacent and parallel to the major face of the pivotable member and selectively operable on said magnetizable material to pivot the pivotable member about the pivot axis so as to alter the position of the fluid jet channel relative to the fluid receiving channel and thereby vary the quantity of the fluid received by the fluid receiving channel.

3. A fluid control device as claimed in claim 1 wherein the fluid jet channel comprises a nozzle which is incorporated in the pivotable member.

4. A fluid control device as claimed in claim 1 wherein the fluid jet channel is a deflector means, which redirects a fluid jet towards the fluid receiving channel.

5. A fluid control device as claimed in claim 1 wherein the pivotable member incorporates two fluid jet nozzles, at positions remote from the pivot axis, and on opposite sides of the pivot axis, which nozzles direct two fluid jets parallel to the major face and transverse to the pivot axis in opposite directions and the receiving member defines two fluid receiving channels, each of which is opposite a fluid jet nozzle to receive fluid therefrom.

6. A fluid control device as claimed in claim 1 wherein the pivotable member includes two fluid jet deflector channels, each of which is at a position remote from the pivot axis but on opposite sides of the pivot axis, and which direct a fluid jet parallel to the major face and transverse to the pivot axis, and, the receiving member defines two fluid receiving channels, each of which is opposite a fluid jet channel to receive fluid therefrom.

7. A fluid control device as claimed in claim 6 wherein the fluid jet channels and fluid receiving channels are U-shaped in cross-section.

8. A fluid control device as claimed in claim 7 wherein the U-shaped cross-section are in opposition to one another.

9. A fluid control device as claimed in claim 1 in which the receiving member and the pivotable member are integrally formed from a single sheet-like element which is sufficiently flexible to allow pivoting of the pivotable member relative to the receiving member.

10. A fluid control device comprising a sheet-like element incorporating cut outs so as to form a receiving member surrounding an integral pivotable member which is so connected to the receiving member as to be pivotable relative to the receiving member about an axis parallel to the major face of the element, the pivotable member incorporating a first layer of non-magnetizable material having a fluid jet channel for producing a fluid jet parallel to the major faces and transverse to the pivot axis at a position remote from the pivot axis and a second layer of magnetizable material, the receiving member incorporating a fluid receiving channel which opens opposite the fluid jet channel to receiving fluid therefrom, and electromagnetic means selectively operable on said magnetizable material to pivot the pivotable member about the pivot axis to change the position of the fluid jet channel relative to the fluid receiving channel and to thereby vary the quantity of fluid received by the fluid receiving channel.

11. A fluid control device as claimed in claim 10, wherein said cut outs are bisymmetrical on opposite sides of said axis.

* * * * *